(12) United States Patent
Jarvis

(10) Patent No.: US 11,607,983 B2
(45) Date of Patent: Mar. 21, 2023

(54) MULTI-BED DUMP TRAILER

(71) Applicant: Multi Dump Technologies LLC, Goodyear, AZ (US)

(72) Inventor: Quinten K Jarvis, Goodyear, AZ (US)

(73) Assignee: MULTI DUMP TECHNOLOGIES LLC, Goodyear, AZ (US)

( * ) Notice: Subject to any disclaimer, the term of this patent is extended or adjusted under 35 U.S.C. 154(b) by 307 days.

(21) Appl. No.: 16/914,076

(22) Filed: Jun. 26, 2020

(65) Prior Publication Data

US 2020/0406804 A1    Dec. 31, 2020

Related U.S. Application Data

(60) Provisional application No. 62/868,695, filed on Jun. 28, 2019.

(51) Int. Cl.
*B60P 1/28* (2006.01)
*B60P 1/60* (2006.01)
*B60P 1/16* (2006.01)

(52) U.S. Cl.
CPC .............. *B60P 1/28* (2013.01); *B60P 1/162* (2013.01); *B60P 1/60* (2013.01)

(58) Field of Classification Search
CPC .. B60P 1/28; B60P 1/1652; B60P 1/60; B60P 1/04; B60P 1/34
USPC .... 298/8 T, 18, 17 R, 19 R, 22 R, 22 J, 22 P, 298/23 R, 23 MD, 23 M, 23 S, 23 D
See application file for complete search history.

(56) References Cited

U.S. PATENT DOCUMENTS

| | | | | |
|---|---|---|---|---|
| 1,013,789 A * | 1/1912 | Name not available | | B60P 1/165 298/18 |
| 1,444,382 A * | 2/1923 | Lee | ........... | B60P 1/24 298/17.5 |
| 3,323,838 A * | 6/1967 | Truccojohna | ........... | B60P 1/165 298/8 R |
| 3,964,791 A * | 6/1976 | Griffis | ........... | B60P 1/34 105/261.1 |
| 6,199,955 B1* | 3/2001 | Rogers | ........... | B60P 1/165 298/8 R |
| 6,814,396 B2* | 11/2004 | Greer | ........... | B60P 3/42 296/183.2 |
| 7,111,907 B2* | 9/2006 | Boon | ........... | B60P 1/26 298/18 |
| 7,360,843 B1* | 4/2008 | Rogers | ........... | B60P 1/165 298/8 R |
| 8,177,304 B2* | 5/2012 | Rogers | ........... | B60P 1/34 298/18 |
| 8,485,607 B2* | 7/2013 | Elliott | ........... | B65F 3/26 298/1 A |

* cited by examiner

*Primary Examiner* — D Glenn Dayoan
*Assistant Examiner* — Sunsurraye Westbrook
(74) *Attorney, Agent, or Firm* — Messner Reeves LLP

(57) ABSTRACT

A trailer includes a metal frame, a first dump bed coupled to the frame substantially near a forward end of the frame, and a second dump bed coupled to the frame substantially near a rearward end of the frame. In an embodiment, the first dump bed is a side-dumping dump bed and the second dump bed is a rear-dumping dump bed.

17 Claims, 14 Drawing Sheets

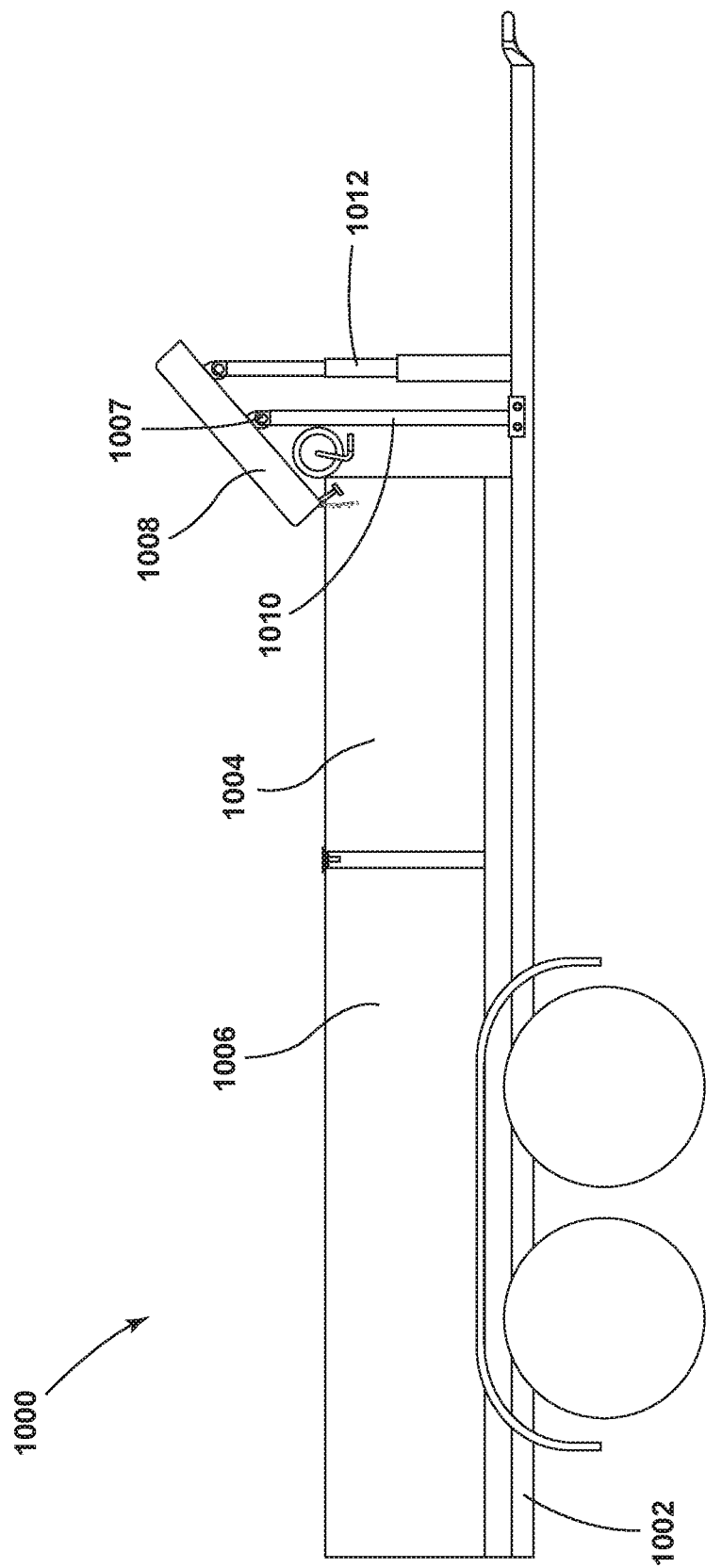

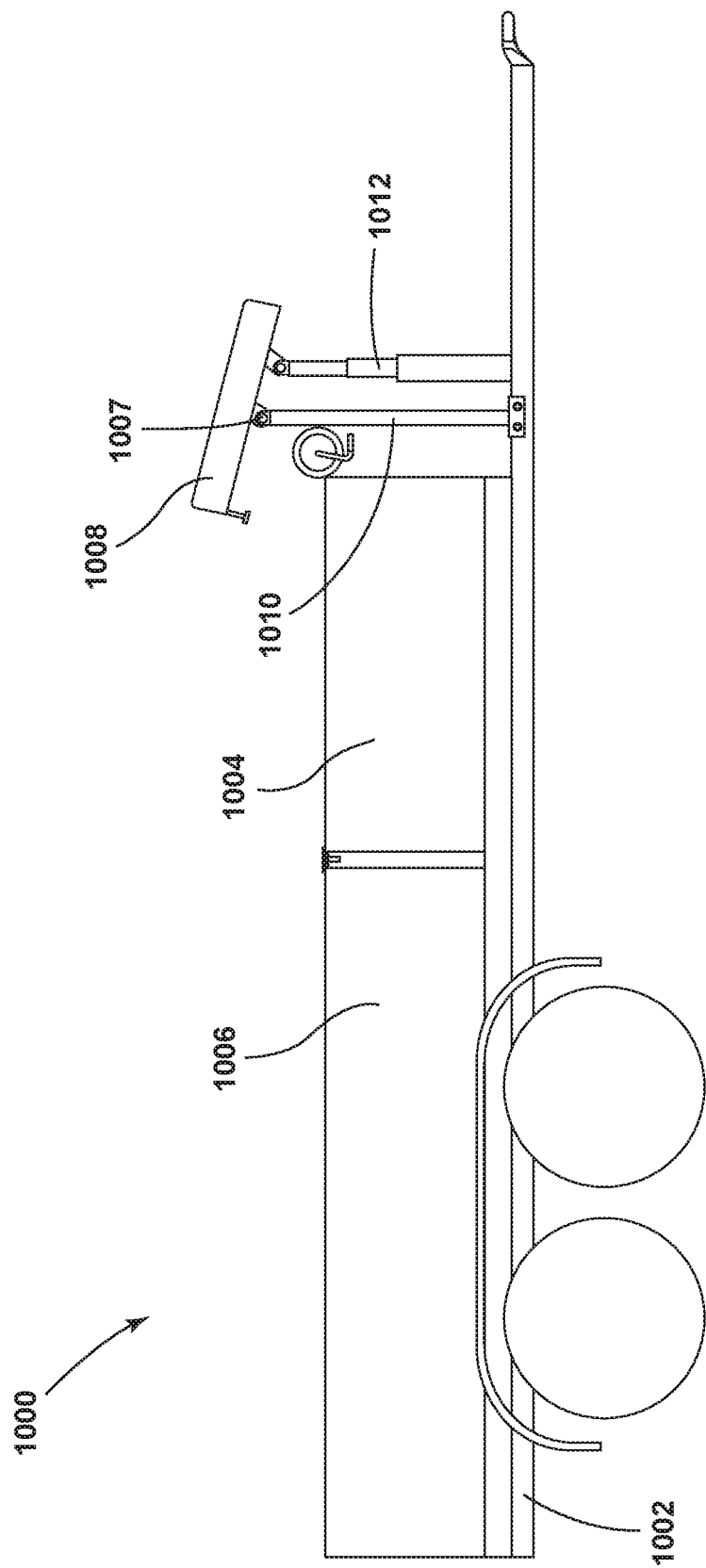

MULTI-BED DUMP TRAILER

CROSS-REFERENCE TO RELATED APPLICATIONS

This application claims priority to and incorporates by reference U.S. Provisional Patent Application No. 62/868,695 entitled "MULTI-BED DUMP TRAILER" and filed on Jun. 28, 2019.

BACKGROUND

A trailer is a device for hauling material which may be towed by a vehicle. For hauling loose material (e.g. gravel, rocks, mulch, sand), a trailer may be configured with a dump bed. A dump bed may be tilted by raising one side. Tilting a dump bed may allow the hauled material to be distributed from the bed onto a work site without needing to manually move the material (e.g. by shoveling).

A work task may include hauling and dumping two or more different loose materials. These different materials may need to be applied to the work site in a specific order (e.g. soil first, then mulch over the soil). With a standard single-bed dump trailer, this task cannot readily be accomplished in a single trip: loading a second material over a first material in a single dump bed will cause mixing of the first and second materials. Load mixing can be reduced by using a tarp or plywood divider between the two or more materials, but this is often impractical. Thus, a single bed dump trailer may necessitate two trips for a two-material job, even if the total amount of material is within the capacity of the dump bed. These additional trips may waste time and fuel. For this and other reasons, a multi-bed dump trailer is proposed.

BRIEF DESCRIPTION OF THE DRAWINGS

FIGS. 10A and 10B depict a simplified illustration of a trailer (e.g., trailer 100 of FIGS. 1 and 2) including a chute actuation system.

DETAILED DESCRIPTION

A multi-bed dump trailer may have more than one bed. Each bed may be a dump bed, a fixed bed, a loading deck, or any configuration of trailer bed. The multiple beds may be in a variety of spatial arrangements. A multi-bed dump trailer may have a forward bed and a rearward bed, or may have two side-by-side beds, or may have two side-by-side rearward beds and a forward bed, or may have two side-by-side forward beds and a rearward bed, or any arrangement of beds. The beds may be rectangular, triangular, or any shape. The beds may be arranged to provide improved trailer stability during a dumping operation.

Figure 1:
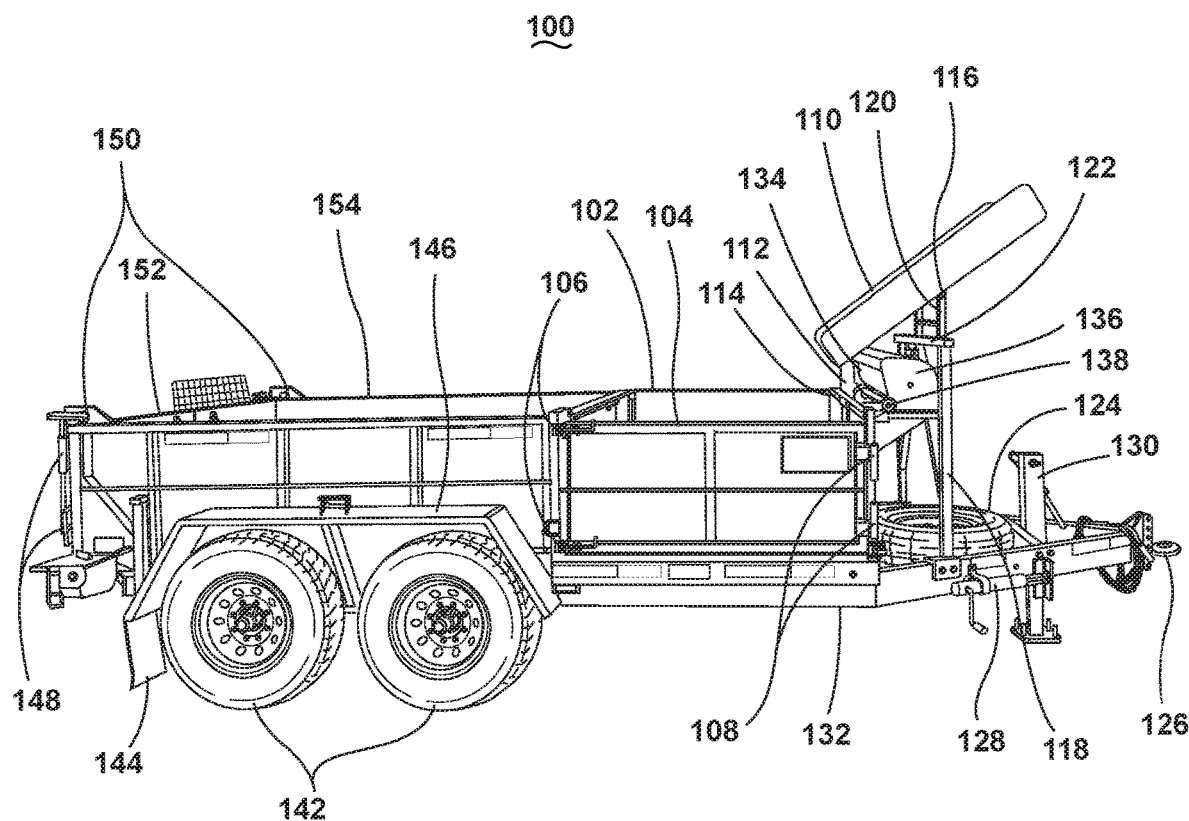
FIG. 1 is a side view of an embodiment of multi-bed dump trailer, with dump beds in lowered position and loading chute in raised position.
Figure 2:
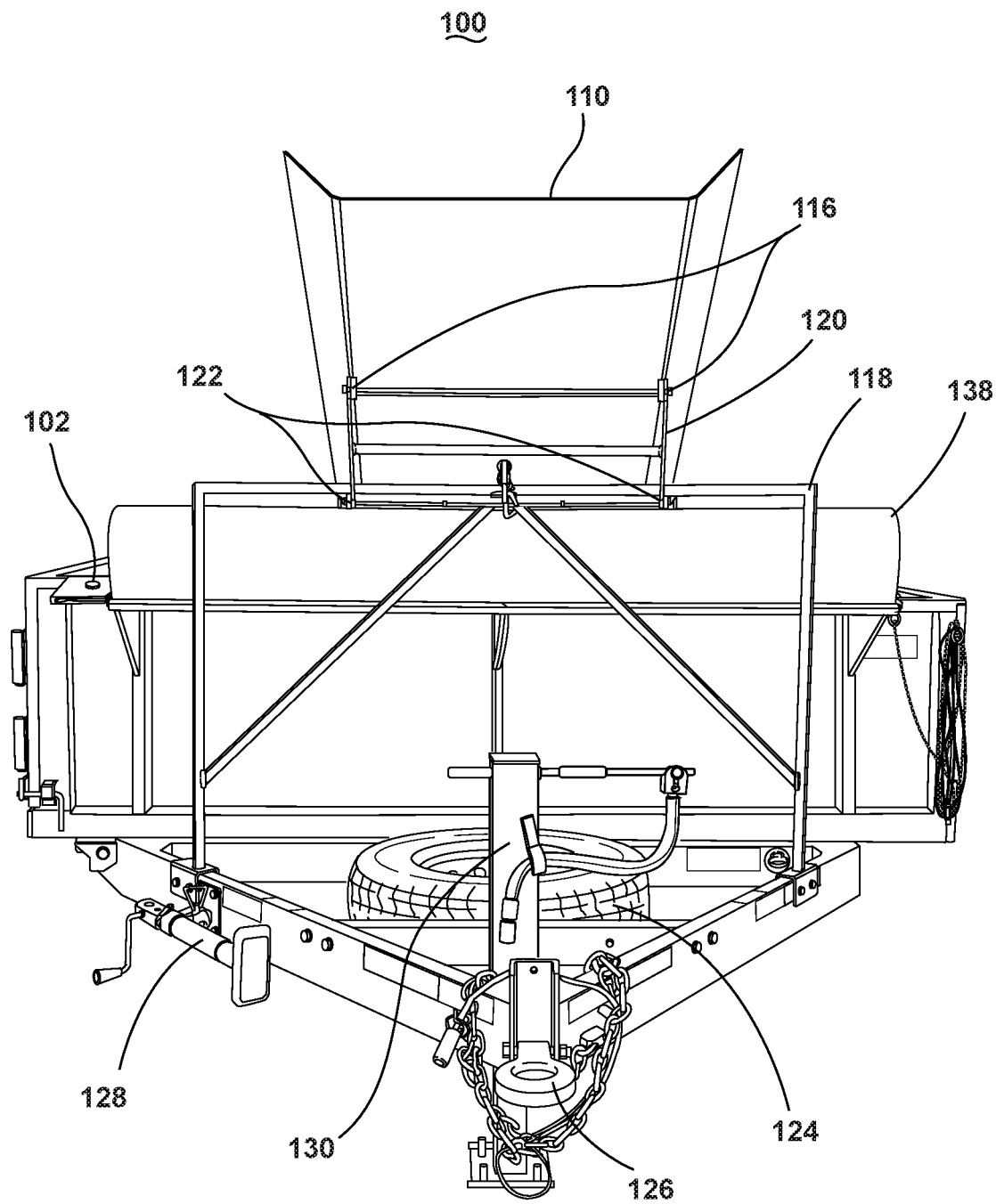
FIG. 2 is a frontal view of multi-bed dump trailer, with dump beds in lowered position and loading chute in a raised position.

As shown in FIGS. 1 and 2, a multi-bed dump trailer 100 may be have a forward dump bed 102 and a rearward dump bed 154. The forward dump bed 102 may be a side-dumping bed (e.g., configured to dump over a side of trailer 100), or any configuration of bed positioned towards the hitch 126 (i.e., front or forward end) of trailer 100. The rearward dump bed 154 may be a rear-dumping bed (e.g., configured to dump over a rear of trailer 100), a side-dumping bed, or any configuration of bed positioned away from the hitch 126 towards the rear for rearward end of trailer 100.

The forward dump bed 102 may have a forward dump gate 104. The forward dump gate may comprise one or more forward gate hinges 108 and one or more forward gate latches 106. The forward dump gate 104 may be a single door gate, with the hinges 108 and latches 106 placed on opposing sides of the gate. The forward dump gate 104 may be a barn door gate, a truck bed gate, a spreader gate, a mesh gate, or any kind of gate. The rearward dump bed 154 may have a rearward dump gate 152. The rearward dump gate may be a barn door gate, with hinges 148 on both the left and right sides of the gate and an opening in the center with latches. The rearward dump gate 152 may be a single door gate, a truck bed gate (e.g., with a hinge to connect a bottom edge of dump gate 152 to trailer 100), a spreader gate, a mesh gate, or any kind of gate.

The frame 132 may be constructed of any form of metal, with example frame materials including steel and aluminum, and example frame material shapes including channel, I-beam, and tubular.

A roll tarp 134 may be attached to the forward end of a multi-bed dump trailer 100. The roll tarp 134 may be unrolled into an extended position, to cover one or more loaded dump beds 102 and 154 during hauling, to prevent material from exiting the dump beds 102 and 154 during hauling. The roll tarp 134 may be rolled up into a rolled position, so that the roll tarp 134 does not block the operation of the dump beds 102 and 154 during loading or unloading. When the roll tarp 134 is in the rolled position, it may be covered by a tarp housing 136. The tarp housing 136 may include a central shaft around which the roll tarp 134 is wound when in the rolled position. The central shaft may be coupled within the tarp housing 136 by a spring mechanism, which may serve to automatically retract the roll tarp 134. The roll tarp 134 may be coupled to a tarp bar 138, which may serve as a support for the rearward end of the roll tarp 134. The tarp bar 138 may be configured to reversibly couple into tarp bar holders 150. Tarp bar holders 150 may be attached on the rearward end of the multi-bed dump trailer 100. The tarp bar 138 may be attached to a tarp bar rope, which may provide a handle for a user to pull the tarp bar 138 more easily from a standing position beside the multi-bed dump trailer 100. Tarp housing 136 may be coupled to forward dump bed 102, or may be coupled to swing arm support 118, or may be coupled any supporting structure.

Figure 3A:
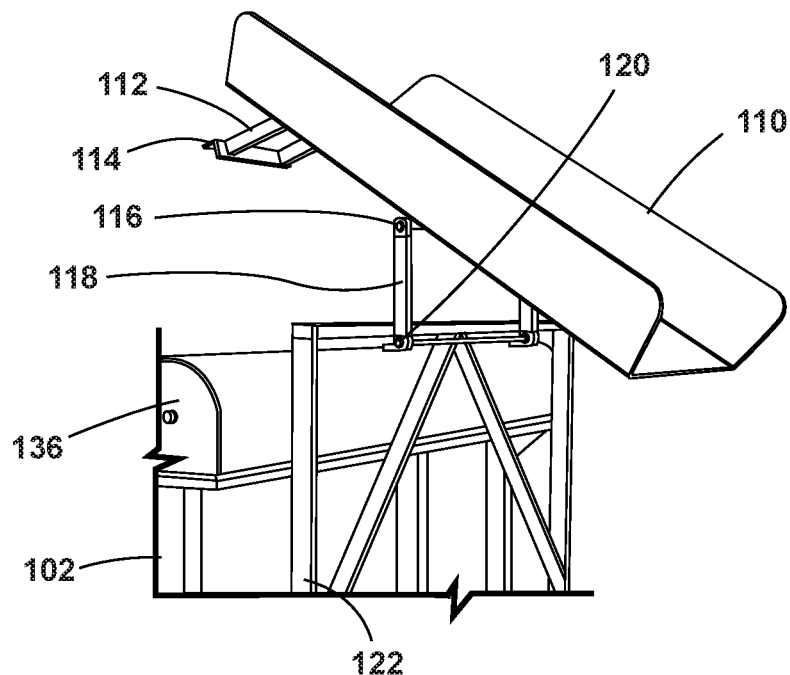
FIG. 3A is a partial side view of multi-bed dump trailer with loading chute in intermediate position.
Figure 3B:
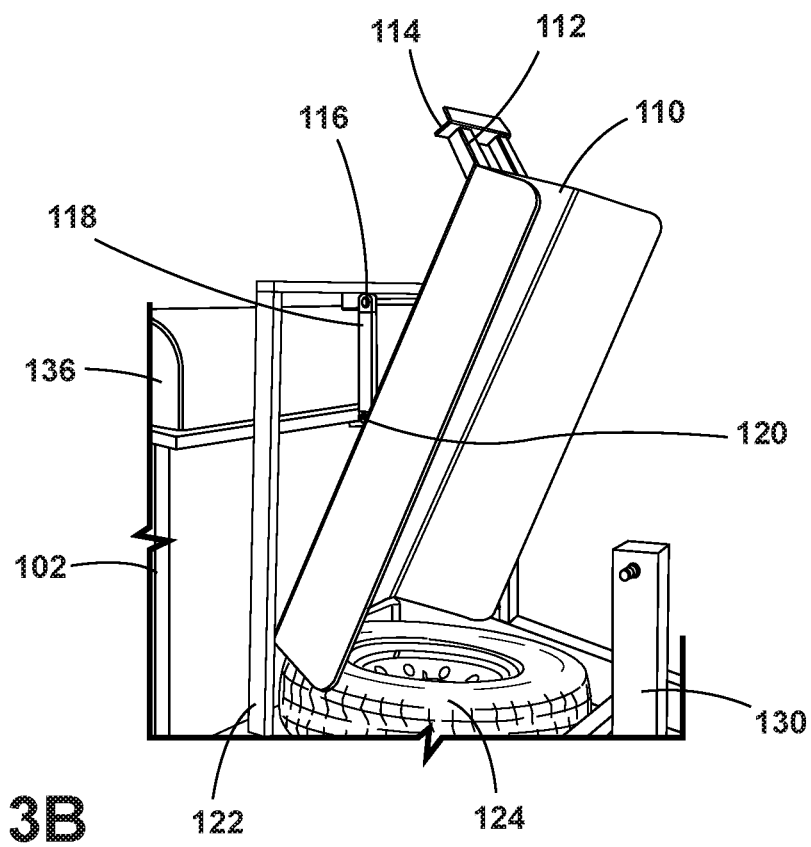
FIG. 3B is a partial side view of multi-bed dump trailer with loading chute in lowered position.

The multi-bed dump trailer 100 may include a loading chute 110. The loading chute 110 may be configured to aid in loading a forward dump bed 102. Equipment used to load a trailer, such as a front-end loader or a skid steer, may have a bucket which is wider than the length of the forward dump bed 102. Dumping from a wider bucket may cause undesired overflow or scattering of material. The loading chute 110 may be placed over a side of the forward dump bed 102 to direct material into the forward dump bed 102. The loading chute 110 may selectively be raised into a raised position above the forward dump bed 102 (e.g. during a loading operation) or lowered into a lowered position out of the path of the dump bed (e.g. during a dumping operation or hauling operation). The chute-raised position is depicted in FIGS. 1 and 2. The chute-lowered position is depicted in FIG. 3B. An intermediate position, as during a raising or lowering operation, is depicted in FIG. 3A.

A chute brace 114 may be used to support the chute 110 when the chute 110 is placed in the raised position. The chute brace 114 may be a section of L-shaped or angled metal. The chute brace 114 may be configured to rest against an upper side of the forward dump bed 102. The chute brace 114 may be coupled to a chute brace arm 112 on one end of the chute brace arm 112. The opposite end of the chute brace arm 112 may be coupled to the chute 110, and may be substantially near to an end of the chute 110.

The chute 110 may be rotationally coupled to a swing arm 120 by one or more chute hinges 116. The swing arm 120 may be rotationally coupled to a swing arm support 118 by one or more swing arm hinges 122. The swing arm support 118 may be rigidly coupled to the frame 132. The two rotational couplings 116 and 122 on opposing ends of the swing arm 120 allow the swing arm 120 to be pivoted and moved from the lowered position (e.g. FIG. 3B), to an intermediate position (e.g. FIG. 3A), to a raised position (e.g. FIG. 2). In the lowered position, the chute 110 may rest against the swing arm support 118. A strap, belt, cord, or other means may be used to selectively attach the chute 110 in the lowered position to the swing arm support 118.

In an embodiment, a bottom surface chute 110 may have a width of approximately 4 feet, with edges having widths of approximately 6 inches formed at a 45 degree angle with the bottom surface.

The chute 110 may be positioned manually. Or, in some embodiments, an actuation mechanism (e.g., an electric motor or pneumatic control system) is coupled to chute 110 enabling powered movement of chute 110. In still further embodiment, a jack-based actuation mechanism may be utilized to control a position of chute 110. For example, FIGS. 10A and 10B depict a simplified illustration of a trailer 1000 (e.g., trailer 100) including a chute actuation system. Trailer 1000 includes a frame 1002 (e.g., frame 132) and forward and rearward dump beds 1004, 1006 (e.g., forward dump bed 102 and rearward dump bed 154), respectively. Trailer 1000 includes chute 1008 (e.g., chute 110). Chute 1008 is connected to support strut 1010 at a hinge 1007 enabling chute 1008 to rotate with respect to support strut 1010. An extendable strut 1012 is connected to chute 1008. As the length of extendable strut 1012 is increased or decreased, chute 1008 can be rotated with respect to frame 1002. This enables chute 1008 to be position in a loading position (as depicted in FIG. 10A) by extending extendable strut 1012, thereby enabling material to be loaded into forward dump bed 1004. Alternatively, extendable strut 1012 can be shortened, enabling chute 1008 to be positioned in a "travel position", such as that shown in FIG. 10B.

Extendable strut 1012 may be operated manually. In that case, extendable strut 1012 can be extended or retracted, by hand, to a desired length and then can be locked into position (thereby inhibiting change to the a length of extendable strut 1012) to provide a desired function. In other cases, extendable strut 1012 may be operated by a mechanism such as a jack or pneumatic actuator to enable powered control over the length of extendable strut 1012 and, in turn, the position of chute 1008 with respect to frame 1002 of trailer 1000.

Returning to FIGS. 1 and 2, the frame 132 may be coupled to fenders 146 on each side. Fenders 146 may be placed above wheels 142. Mud flaps 144 may be coupled to rear side of fenders 146. The frame 132 may be connected to a hitch 126 at the forward end. The hitch 126 may be an adjustable hitch. The hitch 126 may be any configuration of hitch mechanism, including ball hitch, pintle hook hitch, gooseneck hitch, and fifth wheel hitch mechanism. The hitch may serve to provide a point of attachment for a vehicle which may tow the multi-bed dump trailer 100.

The multi-bed dump trailer 100 may include attachment points for one or more ramps. Ramps may assist with loading wheeled equipment (e.g. lawnmower, skid steer). Attachment points may be placed on the forward dump bed 102 or the rearward dump bed 154. Attachment points may facilitate reversible coupling of a ramp to an edge of a trailer bed.

A jack 130 may be attached at the forward end of the multi-bed dump trailer 100. The jack 130 may be used to support the multi-bed dump trailer 100 when not attached to a vehicle. The jack 130 may be used to raise and lower the front end of the multi-bed dump trailer 100 to allow coupling and decoupling of the hitch 126 to a vehicle. The jack 130 may be a manual jack, a pneumatic jack, a hydraulic jack, or any kind of jack. A single jack may be used (see FIG. 1), or a dual jack (see FIG. 8). An auxiliary jack 128 may also be removably attached to the multi-bed dump trailer 100. The auxiliary jack may be removably coupled to the frame 132.

Figure 4A:
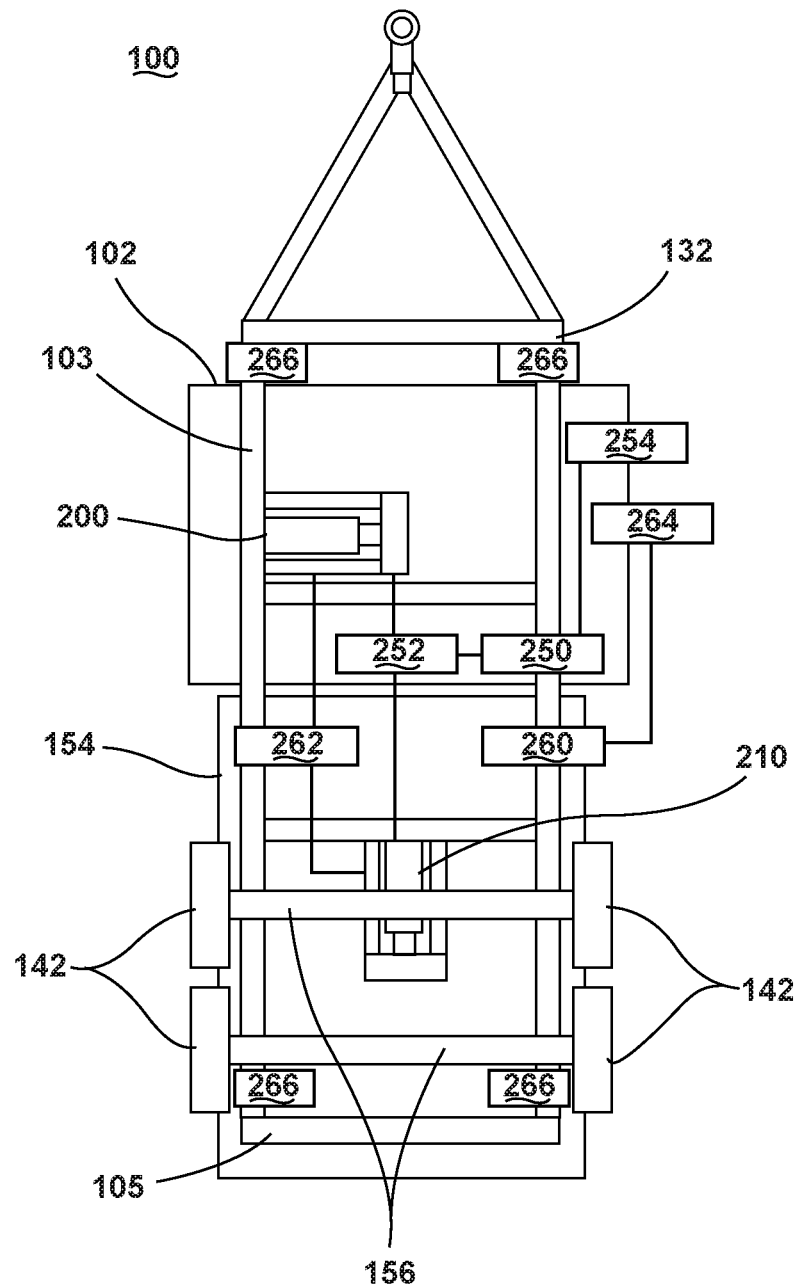
FIG. 4A is a simplified schematic underside view of a multi-bed dump trailer with dump beds in lowered position.

FIG. 4A depicts a simplified underside diagram of the multi-bed dump trailer 100. An axle configuration may comprise a single axle, a dual axle, or any other configuration. The one or more axles 156 may serve as a means to transfer weight from the frame 132 to the wheels 142. The axles 156 may be rotationally coupled to the frame 132. Each axle 156 may be coupled to two or four wheels 142, as in single-wheel or dual-wheel configuration.

Forward bed 102 is coupled to frame 132 by a hinge coupling 103 that runs along a length of frame 132. The configuration of hinge coupling 103 enables forward bed 102 to operate as a side-dump bed. Similarly, rear bed 154 is coupled to frame 132 by hinge coupling 105 that runs laterally across a width of frame 132. The configuration of hinge coupling 105 enables rear bed 154 to operate as a rear-dump bed. In this configuration, hinge coupling 103 is largely perpendicular to hinge coupling 105.

A forward lift mechanism 200 may be used to raise the forward bed 102 and a rearward lift mechanism 210 may be used to raise the rearward bed 154. The two lift mechanisms 200 and 210 may be identical or different. The lift mechanisms 200 and 210 may each be a hydraulic lift, hydraulic actuator, or any kind of lift. The lift mechanisms 200 and 210 may each be telescopic, dual-piston, scissor, or any configuration of lift; and may comprise any arrangement of pistons, cylinders, and hinges. The lift mechanisms 200 and 210 may both be rotationally coupled to the frame 132 and may each be rotationally coupled to the dump beds 102 and 154 respectively.

The lift mechanisms 200 and 210 may use a gravity-down return mechanism or a power-down return mechanism. A gravity-down return mechanism may allow reduced cost, reduced weight, or reduced power usage. A power-down return mechanism may allow greater control over the bed pitch and the return speed regardless of bed load weight and bed load distribution. A power-down return mechanism may be employed to improve performance when loading equipment (e.g. lawnmower, skid steer) onto a dump bed, as it may allow the bed pitch and the return speed of lowering to be readily controlled. An embodiment may use a gravity-down return mechanism for forward lift mechanism 200 and a power-down return mechanism for rearward lift mechanism 210.

In embodiments in which the lift mechanisms 200 and 210 are hydraulic or pneumatic, the operating pumps connected to lift mechanisms 200 and 210 may be connected to both forward bed 102 and rearward bed 154 by valve mechanisms enabling each one of lift mechanisms 200 and 210 to be operated should one of the operating pumps fails.

To illustrate, pump 250 is coupled through valve 252 to both lift mechanism 200 and 210. In a default value position, pump 250, when operated by control interface 254, may control the operation of lift mechanism 200. However, if the position of valve 252 is changed, pump 250 may instead be coupled to lift mechanism 210. Conversely, pump 260 is coupled through valve 262 to both lift mechanism 200 and 210. In a default value position, pump 260, when operated by control interface 264, may control the operation of lift mechanism 210. However, if the position of valve 262 is changed, pump 260 may instead be connected to lift mechanism 200.

In a similar manner, control interfaces 254 and 264 may be connected via appropriate electrical switches (not shown in FIG. 4A) to selectively control the operation of either pump 250 or pump 260. In this manner, control interfaces 254 and 264 can also act as back-ups for one another, should a control interface 254 or 265 fail.

To increase trailer stability during dumping (and, particularly, side dumping) a number of jacks 266 may be positioned about a perimeter of frame 132 of trailer 100.

Figure 4B:
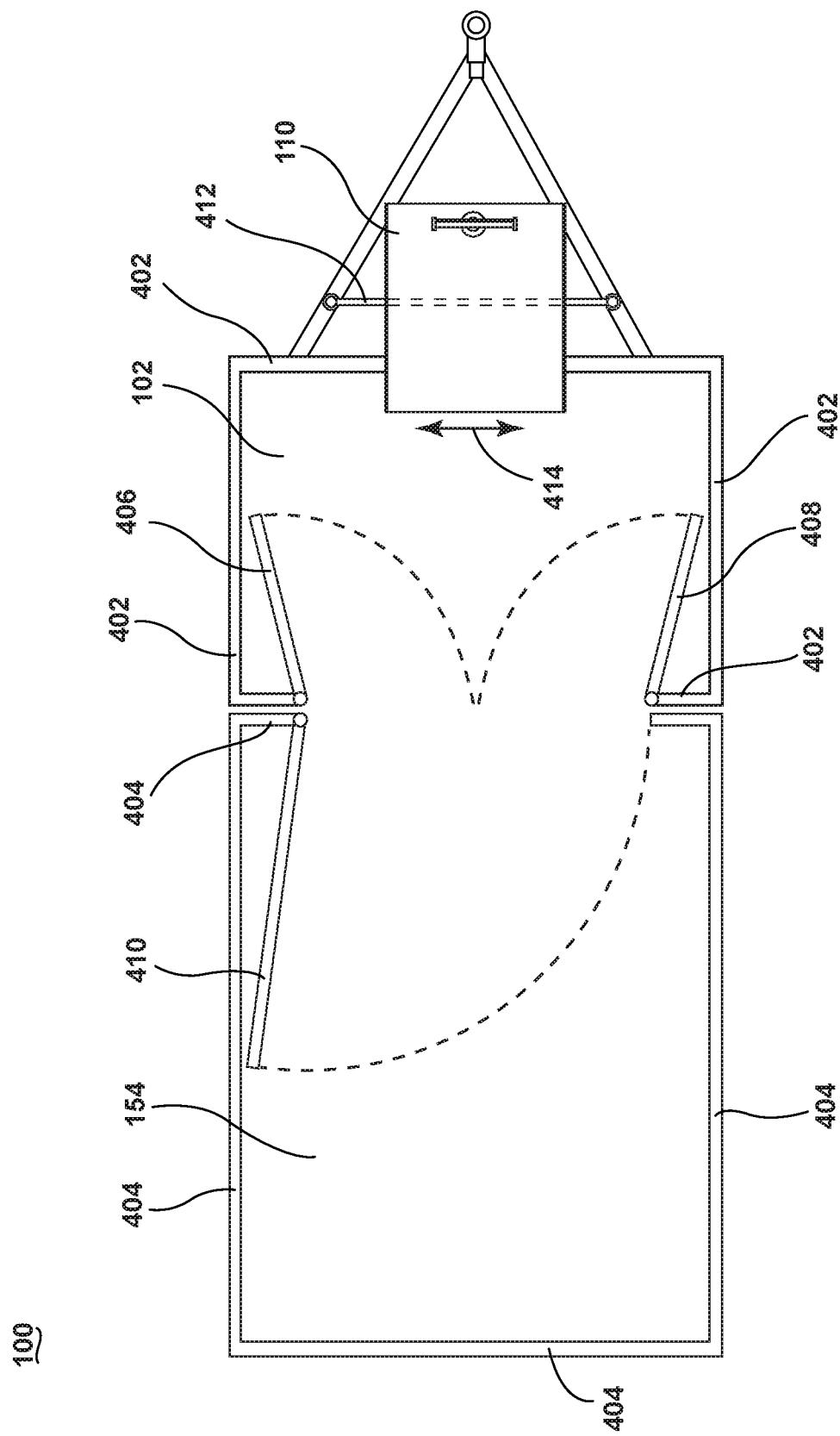
FIG. 4B is a simplified schematic top view of a multi-bed dump trailer with dump beds in lowered position.

FIG. 4B depicts a simplified top view diagram of the multi-bed dump trailer 100 of FIGS. 1 and 2. Trailer 100 includes forward dump bed 102 and rearward dump bed 154. Forward dump bed 102 includes a number of walls 402 running about a perimeter of forward dump bed 102. Rearward dump bed 154 includes a number of walls 404 running about a perimeter of rearward dump bed 102. In the configuration depicted in FIG. 4B, each of forward dump bed 102 and rearward dump bed 154 include internal doors or gates form positioned in interior walls 402 and 404 of forward dump bed 102 and rearward dump bed 154, respectively. For example, forward dump bed 102 includes doors 406 and 408 arranged in a wall 402 of forward dump bed 102 that is rearmost of forward dump bed 102. Similarly, door 410 is positioned in the most forward wall 404 of rearward dump bed 154. In this combination, if doors 406, 408 and 410 are opened fully, a large interior area comprising portions of the volume of both forward dump bed 102 and rearward dump bed 154 becomes accessible. That interior area may be sized to receive material or equipment, such as a skid steer, enabling transportation of the same using trailer 100.

In this configuration, the wall 402 containing doors 406 and 408 and the wall 404 containing door 410 are generally in parallel and positioned relatively close to one another. In embodiments, the distance between the two walls is generally less than 3 feet and sometimes less than 1 foot, although different geometrical configurations are contemplated in which the distance between the walls is larger or smaller.

Trailer 100 includes loading chute 110. As illustrated in FIG. 4B, loading chute 110 can be coupled to a support 412 that runs laterally across a width of trailer 100. Chute 110 may, in some embodiments, be slidably coupled to support 412 enabling lateral repositioning of chute 110 with respect to trailer 100. Such lateral movement is indicated by arrow 414 shown in FIG. 4B.

Figure 5:
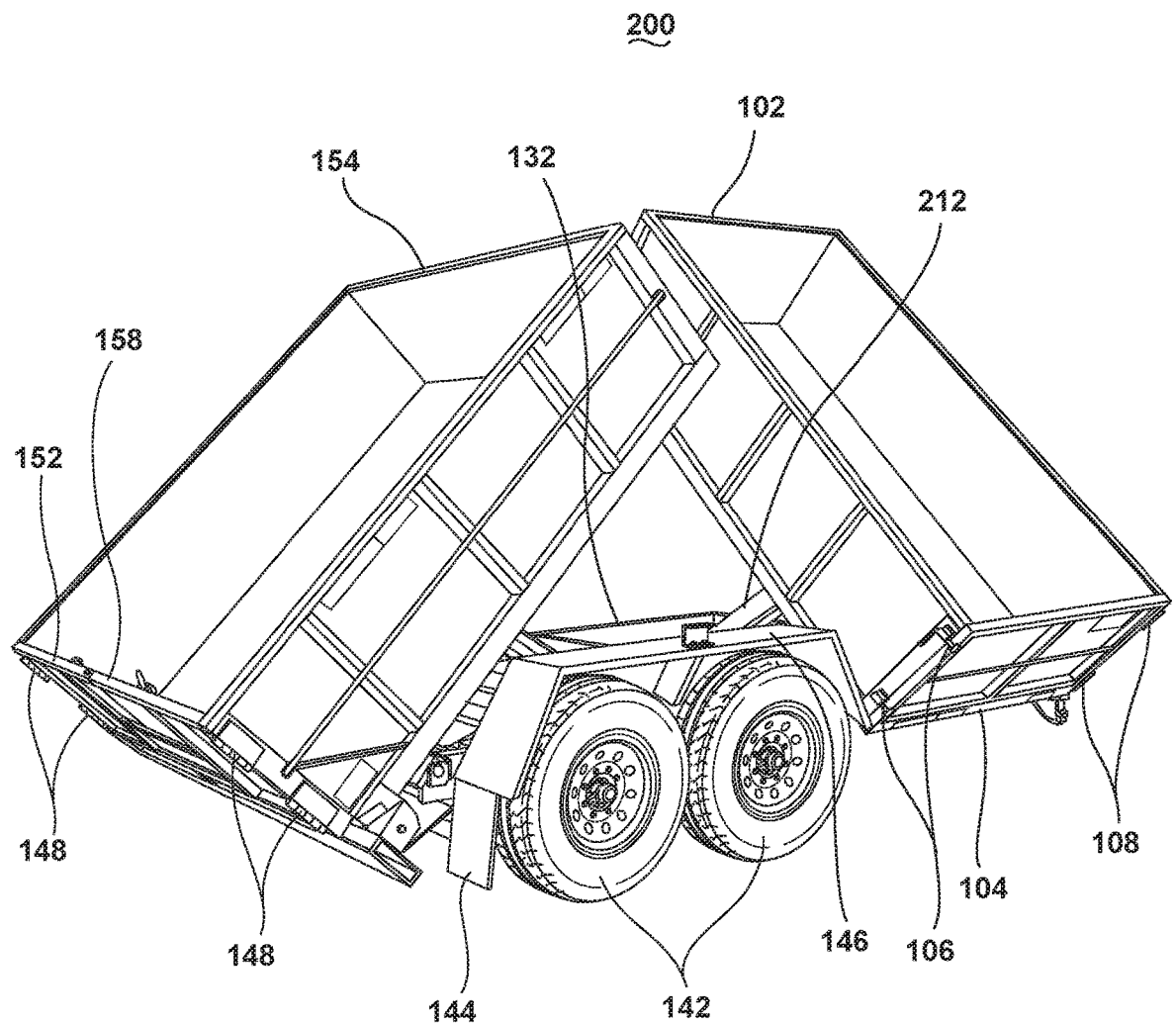
FIG. 5 is a rear-side view of multi-bed dump trailer with dump beds in raised position.

FIG. 5 shows a rear side perspective view of multi-bed dump trailer 100 with forward bed 102 and rearward bed 154 both in a raised position. Rear gate latch 158 is visible in the center of rear dump gate 152, which is a barn door gate in this embodiment. Forward lift mechanism 200 is visible under forward bed 102. Tarp bar holders 150 are not shown.

Figure 6:
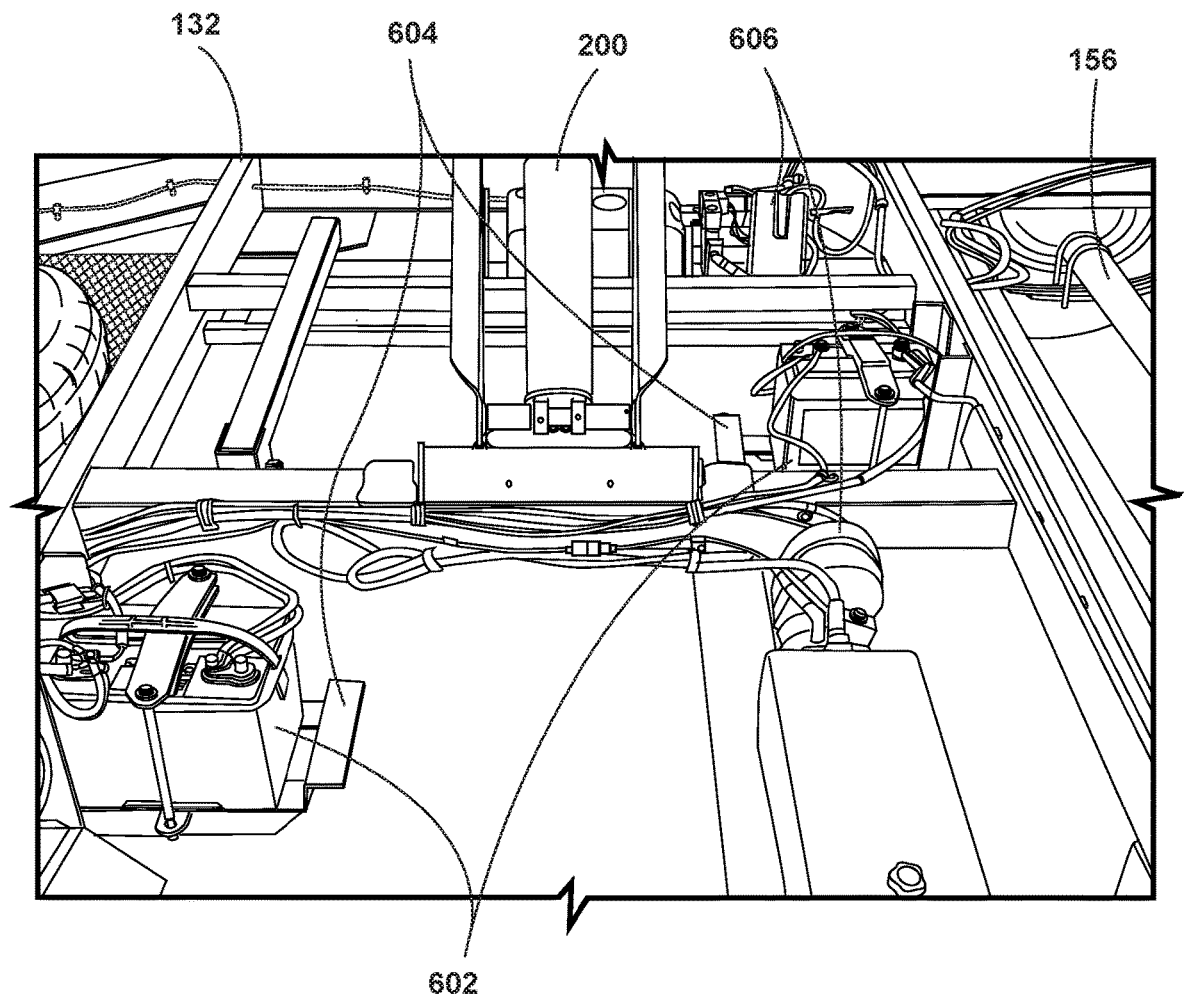
FIG. 6 is a partial upper-side view of components of a multi-bed dump trailer underneath a raised dump bed.

As shown in FIG. 6, one or more batteries 602 may be mounted on multi-bed dump trailer 100. Each battery 602 may be mounted on a battery holder 604. Battery holders 604 may be rigidly coupled to frame 132. Batteries 602 may be electrically connected to one or more hydraulic pump assemblies 606. Hydraulic pump assembly 606 may include hydraulic pump and hydraulic fluid reservoir.

Electrical connections from batteries 602 to hydraulic pump assemblies 606 may include any arrangement of fuses, breakers, and switches. A switch may allow selective modification of electrical connections. An example of such a modification may include adjusting which battery 602 is connected to which hydraulic pump assembly 606, such as for bypassing a discharged battery. This example modification would temporarily preclude independent operation of two dump beds 102 and 154.

Each hydraulic pump assembly 606 may be hydraulically connected to a respective lift mechanism 200 or 210. Lift mechanisms 200 and 210 may each include any arrangement of hydraulic cylinders, hydraulic pistons, rotational bearings, and legs.

Figure 7A:
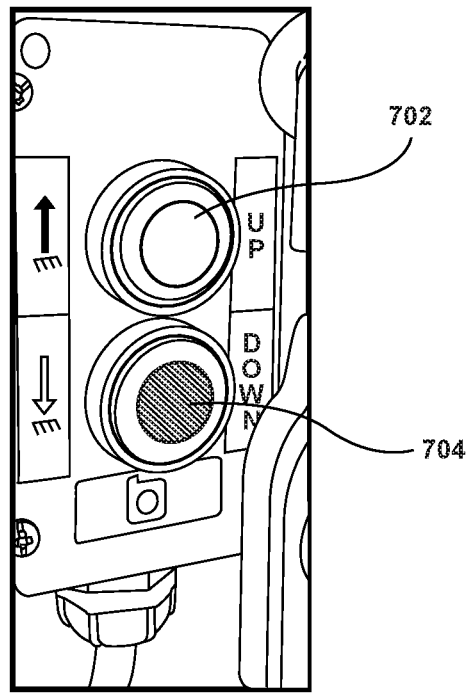
FIG. 7A shows a first controller for a bed of multi-bed dump trailer.
Figure 7B:
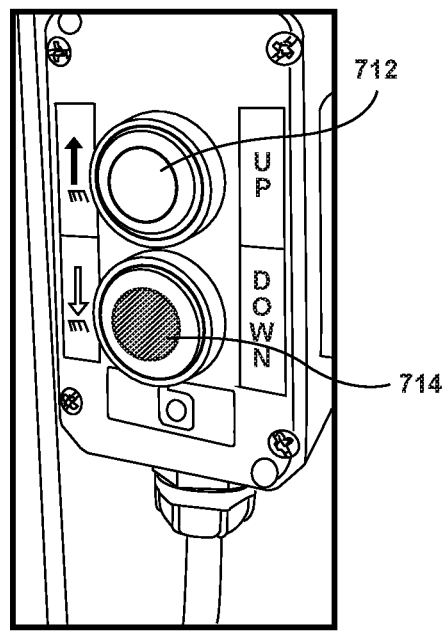
FIG. 7B shows a second controller for a bed of multi-bed dump trailer.

Each hydraulic pump assembly 606 may be electrically connected to a respective controller. A first controller 700 as shown in FIG. 7A may be used to control a hydraulic pump assembly 606 hydraulically connected to forward lift mechanism 200. A second controller 710 as shown in FIG. 7B may be used to control a hydraulic pump assembly 606 hydraulically connected to rearward lift mechanism 210. The first controller may comprise an UP button 702 and a DOWN button 704. When pressed, buttons 702 and 704 may instruct the corresponding hydraulic pump assembly 606 to respectively apply and release pressure and thereby respectively raise and lower the forward lift mechanism 200. Similarly, when pressed, buttons 712 and 714 may instruct the corresponding hydraulic pump assembly 606 to respectively apply and release pressure and thereby respectively raise and lower the rearward lift mechanism 210. The controllers 700 and 710 may operate independently, allowing for each dump bed 102 and 154 to be raised or lowered regardless of the position of the other dump bed 154 and 102 respectively.

Figure 8:
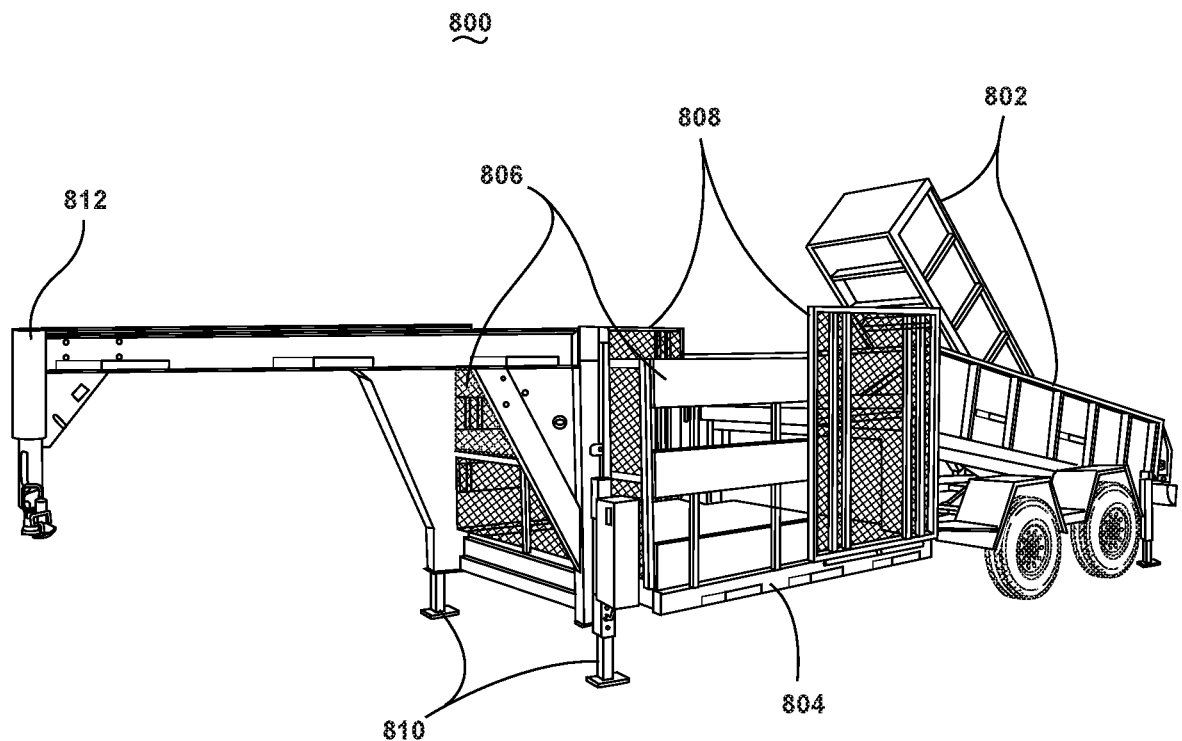
FIG. 8 is a front-side view of an embodiment of a multi-bed dump trailer, with tandem rear-dump beds in partially-raised position and forward deck ramp in closed position.

As shown in FIG. 8, an embodiment of a multi-bed trailer 800 may comprise tandem side-by-side rear dump beds 802. The tandem rear dump beds 802 may have spreader gates or any kind of dump gate. An embodiment may have a forward deck 804, which may be configured for hauling equipment or packaged loads. The forward deck 804 may have any configuration of fixed sides, removable sides 806, folding ramps 808, and removable ramps. The multi-bed dump trailer 800 may have dual forward jacks 810 or any configuration of one or more jacks. The multi-bed dump trailer may have a gooseneck hitch 812 or any configuration of hitch.

Figure 9:
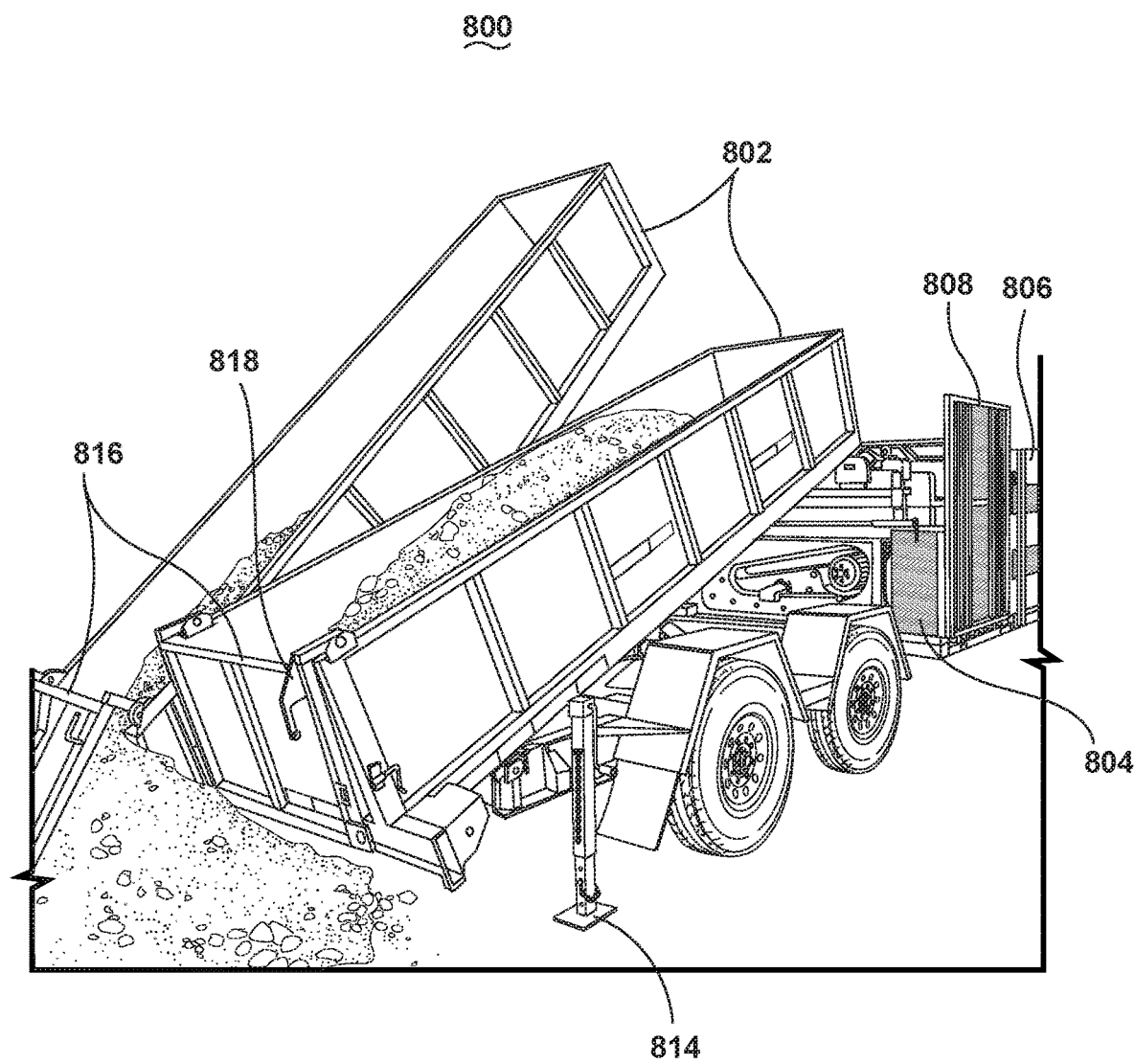
FIG. 9 is a rear-side view of multi-bed dump trailer with tandem rear-dump beds in partially-raised position and forward deck ramp in closed position.

As shown in FIG. 9, multi-bed dump trailer 800 may additionally comprise right and left rear jacks 814 (only the right is visible). Rear jacks 814 may be hydraulic powered or manually powered. Rear jacks 814 may be lowered to improve the stability of the multi-bed dump trailer 800 during a dumping operation. Stability may be important during dumping operations wherein the beds 802 may be raised at different times or heights and therefore apply an asymmetric load to trailer 800. Rear jacks 814 may be raised or may be removed to allow movement of the multi-bed dump trailer 800.

Each dump bed 802 may comprise a rear spreader gate 816 or any configuration of dump gate. Tarp bar holders 818 may be coupled near the left edge of the left spreader gate 816 and the right edge of the right spreader gate 816.

All prior description of multi-bed dump trailer 100 having forward and rearward dump beds 102 and 154 may be equivalently applied to a multi-bed dump trailer 800 having tandem rear dump beds 802. Multi-bed dump trailer 800 may have independent hydraulic controls.

In various embodiments of the present trailer system, additional functionality may be incorporated into the trailer. For example, in some embodiments, additional mechanisms, such as a cable spool jack could be mounted to a frame of the trailer to enable the transport of cable (e.g., fiber optic, electric, and the like) in conjunction with materials loaded into one of the multiple beds of the trailer. To illustrate this optional configurations, FIGS. 10A and 10B show example cable spool jacks 1051 that could be mounted to forward dump bed 1004 and/or rearward dump bed 1006.

Figure 11:
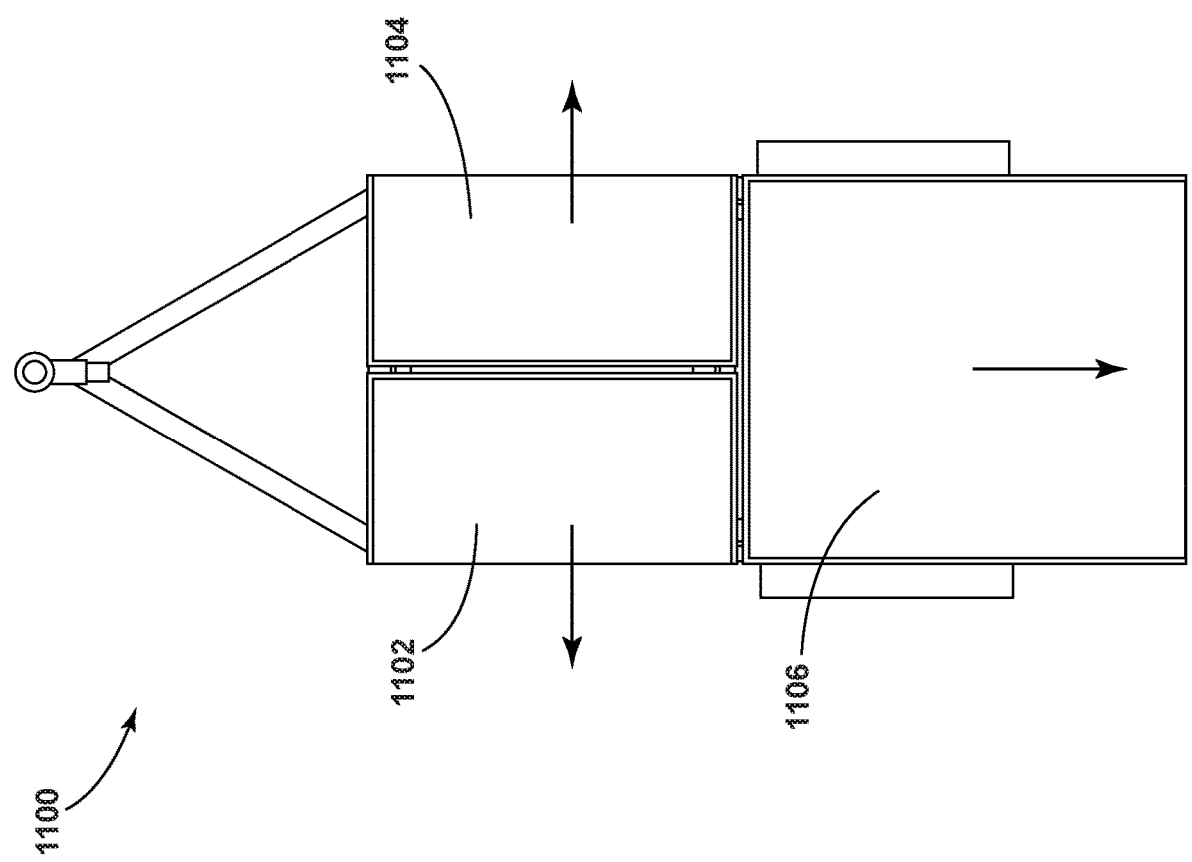
FIG. 11 depicts an example trailer system that includes three dump beds.

In some embodiments, the trailer system may include more than two dump beds. FIG. 11 depicts an example trailer 1100 system that includes three dump beds. Some of the components of trailer 1100, such as the frame construction, lift mechanisms, and the like may be similar to those discussed above. Trailer 1100 includes two forward dump beds 1102 and 1004 and a rearward dump bed. Dump bed 1102 may be configured to dump over a left side of trailer 1000, while dump bed 1104 may be configured to dump over a right side of trailer 1100. Rearward dump bed 1106 may be configured to dump over either side of trailer 1100 or over a rear end of trailer 1100, depending on how rearward dump bed 1006 is mounted to the frame of trailer 1100. Trailer 1000 may include a chute (e.g., chute 110) to facilitate loading of one or more of beds 1102, 1104, and/or 1106. Trailer 1000 may include a number of stability jacks (e.g., jacks 266) to improve trailer stability when loading or dumping material.

Figure 12A:
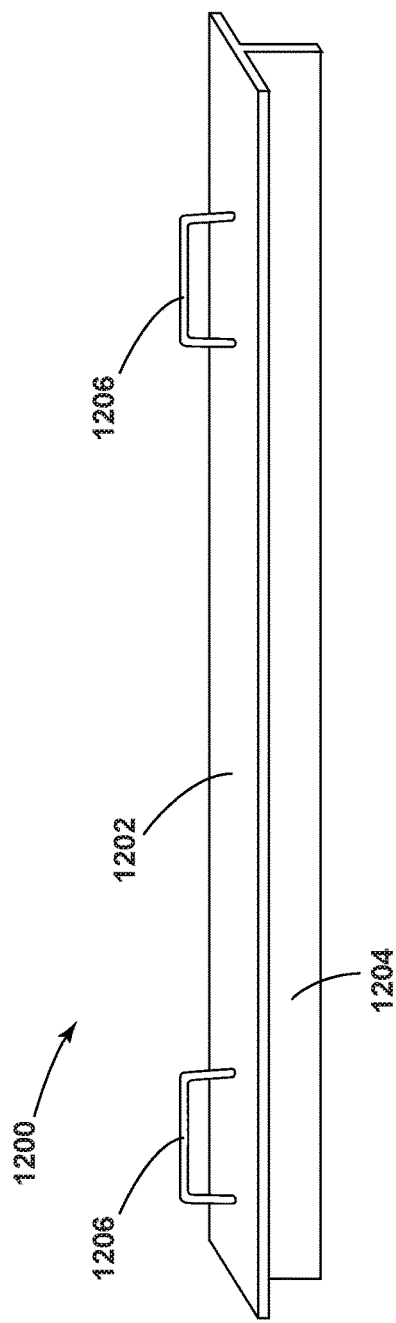
FIGS. 12A and 12B depicts a perspective and side views, respectively, of a fall-through protector.
Figure 12B:
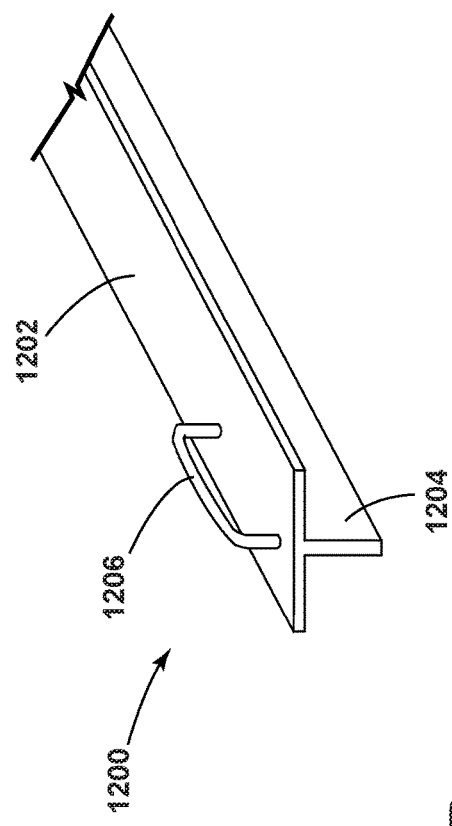

When loading the present trailer system, there is a potential for material being loaded to fall between the multiple trailer beds. To mitigate this problem, FIGS. 12A and 12B depicts a perspective and side views, respectively, of a fall-through protector 1200. Protector 1200 include a horizontal portion 1202 coupled to a vertical plate 1204. Protector 1200 includes handles 1206 to facilitate lifting and placement of protector 1200.

When using protector 1200, a user uses handles 1206 to life protector 1200 and place the protector 1200 into the gap between trailer beds (e.g., the gap between forward dump bed 102 and rearward dump bed 154 or any of the gaps between dump beds 1102, 1104, and 1106 of FIG. 11 when the dump beds are in their lowered position. Specifically, the vertical plate 1204 of protector 1200 is inserted into the gap between dump beds so that the horizontal portion 1202 rests upon the walls of the dump beds on either side of the gap. In this position, protector 1200 can prevent material from falling into the gap between dump beds when either dump bed is filled with material.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

It should be understood that this invention is not limited in its application to the details of construction and the arrangement of components set forth in the preceding description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The preceding discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The preceding detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

In accordance with an embodiment, a trailer includes a metal frame, a first dump bed coupled to the frame substantially near a forward end of the frame, and a second dump bed coupled to the frame substantially near a rearward end of the frame. In an embodiment, the first dump bed is a side-dumping dump bed and the second dump bed is a rear-dumping dump bed. In an embodiment, the first dump bed is coupled to the metal frame by a first hinge and the second dump bed is coupled to the metal frame by a second hinge and an axis of the first hinge is perpendicular to an axis of the first hinge. In an embodiment, the trailer includes a loading chute coupled to the frame forward of the first dump bed, wherein the loading chute is coupled to the frame by one or more hinges such that the loading chute may be selectively placed in a lowered position and in a raised position substantially above the first bed. In an embodiment, the first dump bed and the second dump bed are independently controlled. In an embodiment, the trailer includes a first hydraulic actuator coupled to the first dump bed and the second dump bed and being configured to selectively control a position of the first dump bed and the second dump bed and a second hydraulic actuator coupled to the first dump bed and the second dump bed and being configured to selectively control a position of the first dump bed and the second dump bed. The trailer may include a control interface configured to selectively operate either the first hydraulic actuator of the second hydraulic actuator. In an embodiment, the first dump bed includes a first plurality of walls and a first wall of the first plurality of walls includes a first door, the first wall of the first plurality of walls being perpendicular to a length of the trailer. The second dump bed may include a second plurality of walls and a second wall of the second plurality of walls includes a second door, the second wall of the second plurality of walls being perpendicular to a length of the trailer. A maximum distance between the first wall of the first dump bed and the second wall of the second dump bed may be less than 3 feet.

In an embodiment, a trailer includes a frame, a first dump bed coupled to the frame, a second dump bed coupled to the frame, and a control system configured to independent operate either the first dump bed or the second dump bed. In an embodiment, the first dump bed is a side-dumping dump bed and the second dump bed is a rear-dumping dump bed. In an embodiment, the first dump bed is coupled to the metal frame by a first hinge and the second dump bed is coupled to the metal frame by a second hinge and an axis of the first hinge is perpendicular to an axis of the first hinge. The trailer may include a loading chute coupled to the frame forward of the first dump bed, wherein the loading chute is coupled to the frame by one or more hinges such that the loading chute may be selectively placed in a lowered position and in a raised position substantially above the first bed. In an embodiment, the trailer includes a first hydraulic actuator coupled to the first dump bed and the second dump bed and being configured to selectively control a position of the first dump bed and the second dump bed and a second hydraulic actuator coupled to the first dump bed and the second dump bed and being configured to selectively control a position of the first dump bed and the second dump bed. The control system may include a control interface configured to selectively operate either the first hydraulic actuator of the second hydraulic actuator. In an embodiment, the first dump bed includes a first plurality of walls and a first wall of the first plurality of walls includes a first door, the first wall of the first plurality of walls being perpendicular to a length of the trailer. The second dump bed may include a second plurality of walls and a second wall of the second plurality of walls includes a second door, the second wall of the second plurality of walls being perpendicular to a length of the trailer. In some embodiment, a maximum distance between the first wall of the first dump bed and the second wall of the second dump bed is less than 3 feet.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A trailer, comprising:
   a metal frame;
   a first dump bed coupled to the frame substantially near a forward end of the frame, wherein the first dump bed is a side-dumping bed; and
   a second dump bed coupled to the frame substantially near a rearward end of the frame, wherein the second dump bed is a rear-dumping bed.

2. The trailer of claim 1, wherein the first dump bed is coupled to the metal frame by a first hinge and the second dump bed is coupled to the metal frame by a second hinge and a first axis of the first hinge is perpendicular to a second axis of the second hinge.

3. The trailer of claim 1, further comprising a loading chute coupled to the frame forward of the first dump bed, wherein the loading chute is coupled to the frame by one or more hinges such that the loading chute may be selectively placed in a lowered position and in a raised position substantially above the first bed.

4. The trailer of claim 1, wherein the first dump bed and the second dump bed are independently controlled.

5. The trailer of claim 1, further comprising:
   a first hydraulic actuator coupled to the first dump bed and the second dump bed and being configured to selectively control a first position of the first dump bed and a second position of the second dump bed; and
   a second hydraulic actuator coupled to the first dump bed and the second dump bed and being configured to selectively control the first position of the first dump bed and the second position of the second dump bed.

6. The trailer of claim 5, further comprising a control interface configured to selectively operate either the first hydraulic actuator or the second hydraulic actuator.

7. The trailer of claim 1, wherein the first dump bed includes a first plurality of walls and a first wall of the first plurality of walls includes a first door, the first wall of the first plurality of walls being parallel to a length of the trailer.

8. The trailer of claim 7, wherein the second dump bed includes a second plurality of walls and a second wall of the second plurality of walls includes a second door, the second wall of the second plurality of walls being perpendicular to the length of the trailer.

9. The trailer of claim 8, wherein a maximum distance between the first wall of the first dump bed and the second wall of the second dump bed is less than 3 feet.

10. A trailer, comprising:
- a frame;
- a first dump bed coupled to the frame, wherein the first dump bed is a side-dumping bed;
- a second dump bed coupled to the frame, wherein the second dump bed is a rear-dumping bed; and
- a control system configured to independent operate either the first dump bed or the second dump bed.

11. The trailer of claim 10, wherein the first dump bed is coupled to the frame by a first hinge and the second dump bed is coupled to the frame by a second hinge and a first axis of the first hinge is perpendicular to a second axis of the second hinge.

12. The trailer of claim 10, further comprising a loading chute coupled to the frame forward of the first dump bed, wherein the loading chute is coupled to the frame by one or more hinges such that the loading chute may be selectively placed in a lowered position and in a raised position substantially above the first bed.

13. The trailer of claim 10, further comprising:
- a first hydraulic actuator coupled to the first dump bed and the second dump bed and being configured to selectively control a first position of the first dump bed and a second position the second dump bed; and
- a second hydraulic actuator coupled to the first dump bed and the second dump bed and being configured to selectively control the first position of the first dump bed and the second position of the second dump bed.

14. The trailer of claim 13, wherein the control system includes a control interface configured to selectively operate either the first hydraulic actuator or the second hydraulic actuator.

15. The trailer of claim 10, wherein the first dump bed includes a first plurality of walls and a first wall of the first plurality of walls includes a first door, the first wall of the first plurality of walls being parallel to a length of the trailer.

16. The trailer of claim 15, wherein the second dump bed includes a second plurality of walls and a second wall of the second plurality of walls includes a second door, the second wall of the second plurality of walls being perpendicular to the length of the trailer.

17. The trailer of claim 16, wherein a maximum distance between the first wall of the first dump bed and the second wall of the second dump bed is less than 3 feet.

* * * * *